UNITED STATES PATENT OFFICE 2,474,087

PREPARATION OF SILICON HALIDES

Arthur J. Barry and John W. Gilkey, Midland, and Lee De Pree, Holland, Mich., assignors to The Dow Chemical Company, Midland, Mich., a corporation of Delaware No Drawing. Application May 16, 1947, Serial No. 748,646

5 Claims. (Cl. 260—448.2)

1

This invention relates to a new process for the preparation of halogen-substituted monosilanes. It is particularly concerned with the preparation of monosilanes having a plurality of halogen atoms attached to the single silicon atom in the molecule, such as silicon tetrahalides, trihalosilanes of the type $HSiX_3$, monoalkyltrihalosilanes, haloalkyltrihalosilanes, aryltrihalosilanes, and haloaryltrihalosilanes.

It has been found that a polyhalopolysilane may be reacted with a halohydrocarbon to produce halogen-substituted monosilanes.

Polyhalopolysilanes which may be employed for purposes of this invention are inorganic silicon halides containing at least one silicon-silicon bond, all valences of silicon which are not satisfied by such linkage to other silicon atoms being taken up by halogen atoms. Examples of suitable polyhalopolysilanes include hexachlorodisilane, $Si_2Cl_6$, hexabromodisilane, $Si_2Br_6$, octachlorotrisilane, $Si_3Cl_8$, decachlorotetrasilane, $Si_4Cl_{10}$, or mixtures of such inorganic silicon halides.

Examples of suitable halohydrocarbons include alkyl halides such as methyl chloride, methyl bromide, ethyl chloride, ethyl bromide, dichloroethane, propyl chloride, propyl bromide, butyl chloride, lauryl chloride, and polychloroalkanes, and aromatic halohydrocarbons such as chlorobenzene and dichlorobenzene.

Catalysts for the formation of carbon-silicon bonds, such as cuprous chloride, antimony trichloride, or mercuric chloride, may be added to the starting materials if desired. When employed, such catalyst is usually present in minor amount, e. g. from 1 to 2 parts by weight thereof per 100 parts of halohydrocarbon and polyhalopolysilane.

In general, the reaction between a halohydrocarbon and a polyhalopolysilane is advantageously carried out at a temperature between 100° and 450° C. When an alkyl halide is employed as the halohydrocarbon, it is preferred to conduct the reaction at a temperature below about 350° C. When the halohydrocarbon starting material is an aryl halide, it is usually advantageous to carry out the reaction at a temperature above about 300° C., to ensure an adequate rate of reaction. Operating under the conditions stated above, interaction between the indicated reactants is obtained.

The reaction is conducted at a gauge pressure of at least 5 atmospheres. This may be obtained either by introducing the reactants into the reaction zone under reaction conditions under pressure, or by operating under autogenous pressure in a closed system.

The reaction is preferably conducted under conditions such that at least a portion of the reactants is in liquid phase. Thus, for example, the reaction may be effected in the presence of a mutual solvent, e. g. a paraffin oil. Frequently, one or more of the reactants is liquid under the reaction conditions, and may serve as a solvent for other starting materials. With some particular reactants, at temperatures within the range indicated, pressures below 5 atmospheres may be employed when some liquid phase is obtained therewith.

The overall reaction between a polyhalopolysilane and a halohydrocarbon may be illustrated by the following equation:

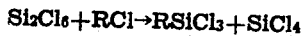

$$Si_2Cl_6 + RCl \rightarrow RSiCl_3 + SiCl_4$$

where R is a monovalent organic radical connected to the silicon through a carbon-silicon bond. In some instances, other products, such as elemental silicon, or a hydrocarbon may also be produced.

As illustrated in the equation above, for each molecular equivalent weight of polyhalopolysilane entering into reaction, one molecular equivalent weight of halohydrocarbon is required. Although it is generally preferred to employ approximately equimolecular equivalent ratios of the reactants, much greater or less proportions may also be employed, e. g. from 0.5 to 3.0 mols of halohydrocarbon per mol of polyhalopolysilane.

The following examples serve to illustrate the process of this invention, but are not to be construed as limiting its scope:

EXAMPLE 1

A mixture comprising 0.56 gram molecular equivalent weight of hexachlorodisilane and 0.50 gram mol of ethyl chloride was placed in a bomb of 500 milliliter capacity. The bomb and contents was heated at from 263° to 277° C. for about 16 hours. Thereafter, the bomb was cooled to approximately room temperature and the contents collected and condensed. Subsequently, the product was fractionally distilled. There was obtained approximately 0.12 gram mol of ethyltrichlorosilane, and 0.24 gram mol of silicon tetrachloride. Unreacted hexachlorodisilane was recovered.

EXAMPLE 2

A 500 milliliter bomb was loaded with approximately 0.50 gram mol of hexachlorodisilane, 0.75 gram mol of ethyl chloride, and about 0.03 gram mol of cuprous chloride. The bomb was then heated for 16 hours at 318°–337° C., during which time the maximum pressure developed within the bomb was 1110 pounds per square inch. The products were recovered as in Example 1. There was obtained approximately 0.30 gram mol of ethyltrichlorosilane, and 0.56 gram mol of silicon tetrachloride.

EXAMPLE 3

By procedure similar to that described in Example 2, 0.75 gram mol of methyl bromide and 0.50 gram mol of hexachlorodisilane were reacted in the presence of cuprous chloride, and the products were collected and purified by fractional distillation. There was obtained 0.48 gram mol of silicon tetrachloride and 0.36 gram mol of monobromotrichlorosilane.

EXAMPLE 4

11.4 parts by weight of a mixture of higher alkyl chlorides, consisting for the most part of dodecyl chloride and tetradecyl chloride, was reacted with 10 parts of hexachlorodisilane in a bomb. The products were collected and fractionally distilled. Silicon tetrachloride was obtained as well as a material distilling within the range of from 151 to 166° C. at 12 millimeters absolute pressure, and containing 23.7 percent of hydrolyzable chlorine. This material contains higher boiling alkyl chlorosilanes, together with unreacted higher alkyl halides.

EXAMPLE 5

By procedure similar to that described in the preceding examples, various halohydrocarbons and polychloropolysilanes were reacted. In each instance, approximately 1 part by weight of cuprous chloride was added for each 100 parts of total halohydrocarbon and polychloropolysilane employed.

The following table names the reactants employed in each experiment, states the molecular proportions in which they were used, gives the temperature at which the bomb was heated, states the maximum pressure, expressed as pounds per square inch, developed within the bomb, and names the compounds constituting the major portion of the product obtained by each reaction.

EXAMPLE 7

The experiment described in Example 2 was repeated, except that mercuric chloride (3 grams) was employed instead of cuprous chloride. There was obtained approximately 0.64 gram mols of silicon tetrachloride and 0.20 gram mols of ethyltrichlorosilane.

EXAMPLE 8

A mixture comprising about 99 percent by weight of 1,4-dichlorobutane and hexachlorodisilane in equimolecular proportions, and about 1.0 percent of cuprous chloride, was heated in a bomb at 193°–209° C. for 16 hours. The products of reaction were collected and fractionally distilled. Silicon tetrachloride and trichlorosilane were obtained.

Modes of applying this invention may be employed other than those specifically disclosed in the examples without departing from the spirit hereof as indicated in the following claims.

That which is claimed is:

1. The method which comprises reacting a halohydrocarbon of the group consisting of alkyl halides and aromatic halohydrocarbons and a polyhalopolysilane containing a silicon-silicon linkage, all valences of the silicon atoms which are not satisfied by such linkage to other silicon atoms being taken up by halogen atoms, in liquid phase at a temperature above 100° C. to produce a polyhalomonosilane, containing a monovalent organic radical attached to the single silicon atom in the molecule through a carbon-silicon bond.

2. The method of making a polyhalomonosilane, containing a monovalent organic radical attached to the single silicon atom in the molecule through a carbon-silicon bond, which comprises reacting a halohydrocarbon of the group consisting of alkyl halides and aromatic halohydrocarbons and an inorganic silicon halide containing a silicon-silicon linkage, all valences of the silicon atoms which are not satisfied by such linkage to other silicon atoms being taken up by halogen atoms, at temperature of from 100° to 450° C. at least a portion of the reactants being in the liquid phase.

3. The method of making a polyhalomonosilane, containing a monovalent organic radical attached to the single silicon atom in the mole-

Table

| Run No. | Halohydrocarbon | | Polyhalopolysilane | | Temp., ° C. | Pressure, p. s. i. | Major Products |
|---|---|---|---|---|---|---|---|
| | Kind | Mols | Kind | Mols | | | |
| 1 | n-propyl chloride | 0.75 | hexachlorodisilane | 0.50 | 311–333 | 930 | n-propyltrichlorosilane / silicon tetrachloride |
| 2 | iso-propyl chloride | 0.75 | do | 0.50 | 313–333 | 940 | n-propyltrichlorosilane / silicon tetrachloride |
| 3 | n-propyl bromide | 0.75 | do | 0.50 | 321–339 | 1,080 | n-propyltrichlorosilane / bromotrichlorosilane / silicon tetrachloride |
| 4 | chlorobenzene | 0.56 | do | 0.38 | 359–376 | 730 | phenyltrichlorosilane / silicon tetrachloride |
| 5 | orthodichlorobenzene | 0.75 | do | 0.50 | 317–339 | 400 | orthochlorophenyltrichlorosilane / silicon tetrachloride |
| 6 | ethyl chloride | 0.83 | octachlorotrisilane | 0.33 | 311–339 | 880 | ethyltrichlorosilane / silicon tetrachloride |

EXAMPLE 6

The procedure of Example 2 was repeated with the exception that antimony trichloride (3 grams) was employed instead of cuprous chloride. There was obtained approximately 0.62 gram mols of silicon tetrachloride and 0.16 gram mols of ethyltrichlorosilane.

cule through a carbon-silicon bond, which comprises reacting an alkyl halide and an inorganic silicon halide containing a silicon-silicon bond, all valences of the silicon atoms which are not satisfied by such linkage to other silicon atoms being taken up by halogen atoms, at a temperature of from 100° to 350° C., at least a portion of the reactants being in the liquid phase.

4. The method of making a polyhalomonosilane, containing a monovalent organic radical attached to the single silicon atom in the molecule through a carbon-silicon bond, which comprises reacting an alkyl halide and an inorganic silicon halide containing a silicon-silicon bond, all valences of the silicon atoms which are not satisfied by such linkage to other silicon atoms being taken up by halogen atoms, at a temperature of from 100° to 350° C., under pressure of at least 5 atmospheres.

5. The method of making a polyhalomonosilane, containing a monovalent organic radical attached to the single silicon atom in the molecule through a carbon-silicon bond, which comprises reacting an aromatic halohydrocarbon and an inorganic silicon halide containing a silicon-silicon bond, all valences of the silicon atoms which are not satisfied by such linkage to other silicon atoms being taken up by halogen atoms, at a temperature of from 300° to 450° C., at least a portion of the reactants being in the liquid phase.

ARTHUR J. BARRY.
JOHN W. GILKEY.
LEE DE PREE.

REFERENCES CITED

The following references are of record in the file of this patent:

UNITED STATES PATENTS

| Number | Name | Date |
| --- | --- | --- |
| 2,379,821 | Miller | July 3, 1945 |

OTHER REFERENCES

Volnov: "Journal Gen. Chem.," U. S. S. R. (1940), vol. 10, pages 1600–1604.